United States Patent
Nakamura et al.

(10) Patent No.: US 9,241,266 B2
(45) Date of Patent: Jan. 19, 2016

(54) AUTHENTICATION SYSTEM, SMALL BASE STATION, AND AUTHENTICATION METHOD

(75) Inventors: Katsuhisa Nakamura, Tokyo (JP); Yoshio Wada, Tokyo (JP); Koki Hayashi, Tokyo (JP); Yuichiro Kameoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 13/129,896

(22) PCT Filed: Nov. 20, 2009

(86) PCT No.: PCT/JP2009/069732
§ 371 (c)(1),
(2), (4) Date: Aug. 5, 2011

(87) PCT Pub. No.: WO2010/058847
PCT Pub. Date: May 27, 2010

(65) Prior Publication Data
US 2011/0287742 A1 Nov. 24, 2011

(30) Foreign Application Priority Data

Nov. 21, 2008 (JP) ................................. 2008-298604

(51) Int. Cl.
*H04W 12/06* (2009.01)
*H04W 84/04* (2009.01)

(52) U.S. Cl.
CPC ............ *H04W 12/06* (2013.01); *H04W 84/045* (2013.01)

(58) Field of Classification Search
CPC ............................ H04W 92/94; H04W 84/045
USPC ............................................... 455/432.2, 444
See application file for complete search history.

(56) References Cited

U.S. PATENT DOCUMENTS 6,496,702 B1 12/2002 Lockhart
6,845,094 B1 * 1/2005 Zhang ........................... 370/349
(Continued)

FOREIGN PATENT DOCUMENTS

CN  1193448 A  9/1998
CN  1224986 A  8/1999
(Continued)

OTHER PUBLICATIONS

"3GPP TR25.813 v0.1.0 (Nov. 2005)". online. The 3rd Generation Partnership Project, Nov. 15, 2005, .retrieved on Apr. 5, 2007. Retrieved from the internet: <URL:http://www.3gpp.org/ftp/Specs/archive/25_series/25.813/25813-010.zip>, paragraph 5.
Office Action dated Jun. 5, 2013 issued by Chinese Foreign Patent Office in counterpart Chinese Application No. 200980146809.2.
(Continued)

*Primary Examiner* — Rafael Pérez-Gutiérrez
*Assistant Examiner* — Joshua Schwartz
(74) *Attorney, Agent, or Firm* — Sughrue Mion, PLLC

(57) ABSTRACT

The present invention relates to an authentication system, a small base station, and an authentication method which allow a server side to authenticate whether an installation position of a small base station is valid or not. In a packet to be sent as an authentication request from the femto base station 1, in-IC card information of an IC card inserted into the femto base station 1 is contained. A network terminating device 2 converts a local IP address described in a header of the packet to a global IP address, and sends it to a femto concentrator 4. The femto concentrator 4 generates authentication information by associating the in-IC card information with the global IP address, and sends it to an authentication server 5. The authentication server 5 determines that the installation position of the femto base station 1 is valid if the in-IC card information and global IP address included in the authentication information have been associated with each other and registered in an authentication table. The present invention can be applied to a base station for a femtocell.

13 Claims, 10 Drawing Sheets

(56) References Cited

U.S. PATENT DOCUMENTS

2007/0287501 A1    12/2007    Hoshina et al.
2008/0076412 A1*    3/2008    Khetawat et al. .......... 455/432.1
2009/0161628 A1     6/2009    Kubota et al.

FOREIGN PATENT DOCUMENTS

| CN | 101232700 A | 7/2008 |
| --- | --- | --- |
| JP | 2004-260445 A | 9/2004 |
| JP | 2004-266331 A | 9/2004 |
| JP | 2004-304394 A | 10/2004 |
| JP | 2004-533790 A | 11/2004 |
| JP | 2007-267424 A | 10/2007 |
| JP | 2008-017382 A | 1/2008 |
| WO | 2007/083541 A1 | 7/2007 |
| WO | 2008/096921 A1 | 8/2008 |

OTHER PUBLICATIONS

Communication dated Sep. 21, 2015 from the European Patent Office in counterpart application No. 09827628.0.

Huawei et al: "pCR on TR 33.820 section 7.6 on Location Certification methods", 3GPP Draft; S3-081587, 3rd Veneration Partnership Project (3GPP), Mobile Competence Centre; No. Kyoto; 20081114, Nov. 14, 2008, XP050334662.

Huawei: "Iu-based 3G HNB Architecture", 3GPP Draft; R3-081166_IU Based 3G HNB Architecture, 3rd Generation Partnership Project (3GPP), vol. RAN WG3, No. Kansas City, USA; 20080430, (2008), XP050164359.

P. Srisuresh, Lucent Technologies, Matt Holdrege, Ascend Communications P: "IP Network Address Translator (NAT) Terminology and Considerations; draft-ietf-nat-terminology-03.txt", vol. nat, No. 3. Jun. 1, 1999 XP015024097, ISSN: 0000-0004.

* cited by examiner

AUTHENTICATION SYSTEM, SMALL BASE STATION, AND AUTHENTICATION METHOD

CROSS REFERENCE TO RELATED APPLICATIONS

This application is a National Stage of International Application No. PCT/JP2009/069732 filed Nov. 20, 2009, claiming priority based on Japanese Patent Application No. 2008-298604, filed Nov. 21, 2008, the contents of all of which are incorporated herein by reference in their entirety.

TECHNICAL FIELD

The present invention relates to an authentication system, a small base station, and an authentication method, and particularly to an authentication system, a small base station, and an authentication method which allow a server side to authenticate whether an installation position of a small base station is valid or not.

BACKGROUND ART

While a "cell" is a concept representing a communication area which a base station covers, a "femtocell" has recently attracted attention as one for covering a small area with a radius of several tens of meters such as within a home or an office.

"Femtocell" is built by connecting a femto base station, which is a base station that outputs radio waves at a level where such a small area is covered, with a terminating device of a broadband network installed on the premises such as an ADSL (Asymmetric Digital Subscriber Line) modem or an ONU (Optional Network Unit).

Unlike a "macrocell", which is a wide cell for the general public having a radius of several hundreds of meters to several kilometers, a "femtocell" provides communication service to limited users such as residents in a house in which a femto base station is installed.

CITATION LIST

Patent Literature

[Patent Literature 1] Japanese Patent Laid-Open No. 2007-267424

SUMMARY OF INVENTION

Technical Problem

Although the output level of radio waves is low and installation just requires connecting with a network terminating device in premises, such a base station is restricted by law and required to satisfy conditions of administrative direction as long as it is a base station for a mobile device. For example, femto base stations are required to be in a fixed installation position.

Accordingly, femto base stations need to have a function, for example, which provides femtocell service if the installation position remains in a position specified by a service carrier, and stops outputting radio waves and forbids use of the service if the installation position has been moved.

The present invention is made in view of such circumstances, and intended to allow a server side to authenticate whether an installation position of a small base station is valid or not.

Solution to Problem

A first authentication system of the present invention is an authentication system including a small base station which performs communication with a mobile device and whose coverage area is an area smaller than a coverage area of a macro base station that constitutes a public network, a network terminating device which is connected to the small base station through an in-house network and connected to a wide area network, and an authentication server, wherein the small base station includes transmission means for sending a first authentication request to the network terminating device, the first authentication request including identification information of itself and a local IP address assigned within the in-house network, wherein the network terminating device includes transmission means for converting the local IP address included in the first authentication request to a global IP address assigned to itself and sending a second authentication request to the authentication server through the wide area network, the second authentication request including the global IP address and the identification information sent from the small base station, and wherein the authentication server includes storage means for storing identification information of each small base station and a global IP address assigned to a network terminating device to which each respective small base station is connected, such that the identification information and the global IP address are associated with each other, and authentication means for performing authentication of the small base station which has sent the first authentication request wherein the small base station is determined to be valid if the identification information and the global IP address which are included in the second authentication request have been associated with each other and stored in the storage means, and determined to be not valid if the identification information and the global IP address have not been associated with each other and stored.

A second authentication system of the present invention is an authentication system including a small base station which performs communication with a mobile device and whose coverage area is an area smaller than a coverage area of a macro base station that constitutes a public network, a network terminating device which is connected to the small base station through an in-house network and connected to a wide area network, a concentrator which is connected to the network terminating device through the wide area network, and an authentication server, wherein the small base station includes transmission means for sending a first authentication request to the network terminating device, the first authentication request including identification information of itself and a local IP address assigned within the in-house network, wherein the network terminating device includes transmission means for converting the local IP address included in the first authentication request to a global IP address assigned to itself and sending a second authentication request to the concentrator through the wide area network, the second authentication request including the global IP address and the identification information sent from the small base station, and wherein the concentrator includes transmission means for sending authentication information to the authentication server, the authentication information associating the identification information sent from the network terminating device and the global IP address with each other, and wherein the authentication server includes storage means for storing identification information of each small base station and a global IP address assigned to a network terminating device to which each respective small base station is connected, such that the identification information and the global IP address are associated with each other, and authentication means for performing authentication of the small base station which has sent the first authentication request wherein the small base station is determined to be valid if the identification information and the global IP address which are included in the authentication information have been associated with each other and stored in the storage means, and determined to be not valid if the identification information and the global IP address have not been associated with each other and stored.

A first small base station of the present invention is a small base station which performs communication with a mobile device and whose coverage area is an area smaller than a coverage area of a macro base station that constitutes a public network, the small base station including transmission means for sending a first authentication request to the network terminating device, the first authentication request including identification information of itself and a local IP address assigned within the in-house network.

There is further provided radio communication controlling means for starting outputting a radio wave if information which is sent from the authentication server and which indicates that authentication has succeeded is supplied through the network terminating device.

An authentication method according to the present invention is an authentication method of a small base station which performs communication with a mobile device and whose coverage area is an area smaller than a coverage area of a macro base station that constitutes a public network, the authentication method including a step of sending a first authentication request to a network terminating device, the first authentication request including identification information of itself and a local IP address assigned within the in-house network, wherein in the network terminating device which has received the first authentication request, the local IP address assigned to the small base station within the in-house network is converted to a global IP address assigned to the network terminating device, and the converted IP addresses is sent as a second authentication request to the authentication server through the wide area network, and wherein in the authentication server which has received the second authentication request, authentication of the small base station is performed wherein the small base station is determined to be valid if the identification information and the global IP address which are included in the second authentication request have been associated with each other and stored in storage means, and determined to be not valid if the identification information and the global IP address have not been associated with each other and stored.

A second small base station of the present invention is a small base station which performs communication with a mobile device and whose coverage area is an area smaller than a coverage area of a macro base station that constitutes a public network, the small base station being connected with a wide area network, the small base station including transmission means for sending an authentication request including identification information of itself and a global IP address assigned to itself to an authentication server connected through the wide area network.

A third small base station of the present invention is a small base station which performs communication with a mobile device and whose coverage area is an area smaller than a coverage area of a macro base station that constitutes a public network, the small base station being connected with a wide area network, the small base station including generating means for generating an authentication request including identification information of the small base station and a local IP address assigned inside the small base station, converting means for assigning the local IP address to the generating means and converting the local IP address included in the authentication request generated by the generating means to a global IP address, and transmission means for sending the authentication request including the identification information and the global IP address to an authentication server connected through the wide area network.

According to the first authentication system of the present invention, by the small base station, the first authentication request including identification information of itself and a local IP address assigned within the in-house network is sent to the network terminating device, and by the network terminating device, the local IP address included in the first authentication request is converted to a global IP address assigned to itself, and a second authentication request including the global IP address and the identification information sent from the small base station is sent to the authentication server through the wide area network. Further, by the authentication server, authentication of the small base station which has sent the first authentication request is performed wherein the small base station is determined to be valid if the identification information and the global IP address which are included in the second authentication request have been associated with each other and stored, and determined to be not valid if the identification information and the global IP address have not associated with each other and stored.

According to the second authentication system of the present invention, by the small base station, the first authentication request including identification information of itself and a local IP address assigned within the in-house network is sent to the network terminating device, and by the network terminating device, the local IP address included in the first authentication request is converted to a global IP address assigned to itself, and a second authentication request including the global IP address and the identification information sent from the small base station is sent to the concentrator through the wide area network. Further, by the concentrator, the authentication information associating the identification information sent from the network terminating device and the global IP address with each other is sent to the authentication server, and by the authentication server, authentication of the small base station which has sent the first authentication request is performed wherein the small base station is determined to be valid if the identification information and the global IP address which are included in the authentication information have been associated with each other and stored in the storage means, and determined to be not valid if the identification information and the global IP address have not been associated with each other and stored.

According to the small base station and the authentication method of the present invention, the first authentication request including identification information of itself and a local IP address assigned within the in-house network is sent to the network terminating device.

According to the second small base station of the present invention, by the small base station connected with a wide area network, which performs communication with a mobile device and whose coverage area is an area smaller than a coverage area of a macro base station that constitutes a public network, an authentication request including identification information of itself and a global IP address assigned to itself is sent to an authentication server connected through the wide area network.

According to the third small base station of the present invention, by the small base station connected with a wide area network, which performs communication with a mobile device and whose coverage area is an area smaller than a coverage area of a macro base station that constitutes a public network, an authentication request including identification information of the small base station and a local IP address assigned inside the small base station is generated, the local IP address included in the generated authentication request is converted to a global IP address, and the authentication request including the identification information and the global IP address is sent to an authentication server connected through the wide area network.

Advantageous Effects of Invention

According to the present invention, whether an installation position of a small base station is valid or not can be authenticated on a server side.

DESCRIPTION OF EMBODIMENTS

First Embodiment

Figure 1:
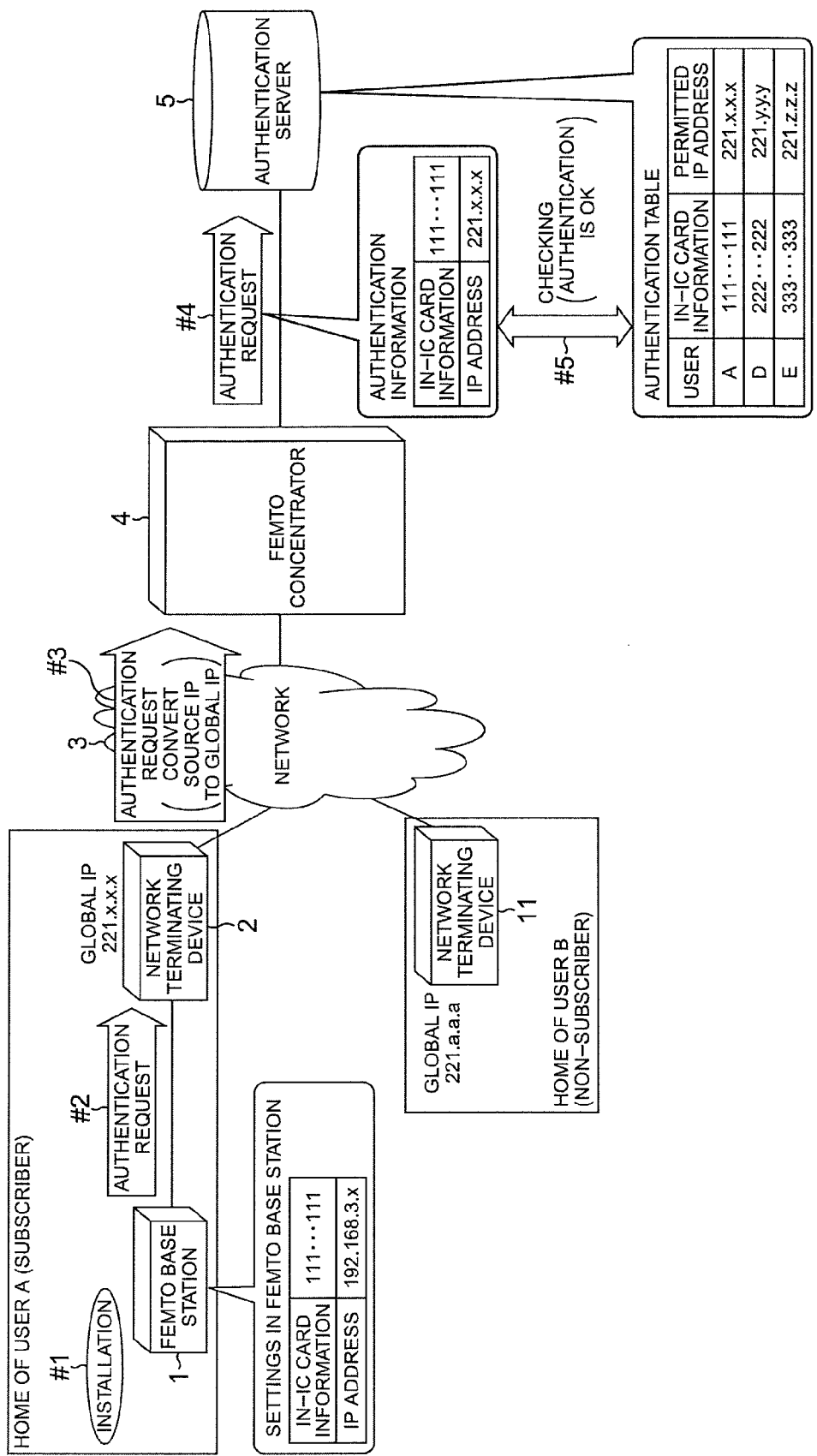
FIG. 1 is a diagram showing a configuration example of an authentication system and an example of a flow of authentication according to one embodiment of the present invention.

FIG. 1 is a diagram showing a configuration example of an authentication system and an example of a flow of authentication according to one embodiment of the present invention.

In the authentication system of FIG. 1, it is configured that whether an installation position of a femto base station is valid or not is authenticated by a server which is managed by a carrier which provides femtocell service and the like.

As used herein, an installation position of a femto base station being valid means that the femto base station is installed in the position specified by a carrier. For example, the carrier notifies a subscriber of femtocell service that the femto base station cannot be used in any place other than premises such as a home or an office where the service is to be provided or the like notice.

[Configuration Example of the Authentication System]

The authentication system of FIG. 1 is basically composed of a femto base station 1, a network terminating device 2, a network 3, a femto concentrator 4, and an authentication server 5.

In the example of FIG. 1, the femto base station 1 and the network terminating device 2 are installed in a home of a user A who is a subscriber of the femtocell service. The network terminating device 2 is provided to the user A, for example, by a carrier lending it to the user A when communication service using the network 3 is subscribed. Further, the femto base station 1 is provided to the user A from the same carrier when the femtocell service is subscribed in addition to the communication service.

Additionally, in the example of FIG. 1, a network terminating device 11 is installed in a home of a user B who is not a subscriber of femtocell service. The user B is a user who is subscribing communication service using a network 3 by contracting with the same carrier as that of the user A, but not subscribing femtocell service. The network terminating device 11 is provided to the user B when the communication service is subscribed.

When information indicating that authentication by the authentication server 5 has succeeded is sent to the femto base station 1, the femto base station 1 starts outputting radio waves to communicate with a mobile device of the user A existing in the femtocell and allow the user A to use the femtocell. A flow of the authentication will be described later.

The femto base station 1 is connected with the network terminating device 2 through a cable such as a LAN (Local Area Network). A local IP address is assigned to the femto base station 1 by the network terminating device 2 in a case where the network terminating device 2 is provided with a router function, or by a router device connected to the LAN constructed in the home of the user A. In the example of FIG. 1, "192.168.3.x" is assigned as a local IP address as shown in a balloon coming from the femto base station 1.

When the femto base station 1 is provided, the carrier issues an IC card in which IMSI (International Mobile Subscriber Identity) information is stored, which is unique identification information composed of a number with predetermined digits or the like.

The user A, who is the subscriber of the femtocell service, has to perform installation operations as a preparation to use the femtocell service, such as inserting the IC card into a slot provided on the femto base station 1 and connecting the femto base station 1 with the network terminating device 2. In the example of FIG. 1, in-IC card information (IMSI information) which is stored in the IC card inserted into the femto base station 1 is set to "111 . . . 111".

The network terminating device 2 is a terminating device of the network 3, which is a wide area network using a broadband network such as an ADSL line or an optical fiber line. The network terminating device 2 is connected to the network 3 through a telephone line or the like, and sends information sent from the femto base station 1 to another device on the network 3, or sends information sent from another device through the network 3 to the femto base station 1.

For example, the network terminating device 2 sends information from the femto base station 1, to the femto concentrator 4 through the network 3. In addition, the network terminating device 2 receives information such as a result of authentication when the information is sent from the authentication server 5 through the femto concentrator 4 and the network 3, and sends the received information to the femto base station 1.

A fixed global IP address is previously assigned to the network terminating device 2. For example, global IP addresses in a predetermined range are assigned to the carrier, and a global IP address is selected and assigned from them depending on a residence address of the home of the user A.

In the example of FIG. 1, "221.x.x.x" is assigned as the global IP address as shown above the network terminating device 2.

The network terminating device 2 has a function of NAT (Network Address Translation), and uses a global IP address assigned to itself as an IP address for identifying a source of information sent from the femto base station 1. Aside from the femto base station 1, communication devices such as a personal computer and a router device are connected to the network terminating device 2 as necessary.

The femto concentrator 4 receives information sent from respective femto base stations including the femto base station 1, and sends the received information to the authentication server 5. For example, when an authentication request which is a request of authentication of an installation position is sent from the femto base station 1 through the network terminating device 2 and the network 3, the femto concentrator 4 receives it and sends it to the authentication server 5. The femto concentrator 4 and the authentication server 5 may be connected through a dedicated line or may be connected through a network such as the Internet.

The authentication server 5 is a server managed by a carrier which provides communication service using the network 3 and femtocell service. The authentication server 5 receives an authentication request sent from the femto concentrator 4, and performs authentication of an installation position of the femto base station which has sent the authentication request with reference to an authentication table.

In the authentication table managed by the authentication server 5, in-IC card information of the issued IC card and a global IP address of a provided network terminating device are associated with each other and registered for each subscriber of femtocell service. For example, in-IC card information and a global IP address are registered in the authentication table when a network terminating device and a femto base station are provided to a user who subscribes communication service and femtocell service.

In the example of FIG. 1, as information of the user A, the in-IC card information "111 . . . 111" of the IC card issued to the user A and the global IP address "221.x.x.x" of the network terminating device 2 provided to the user A are associated with each other and registered.

In addition, as information of a user D, in-IC card information "222 . . . 222" of the IC card issued to the user D and a global IP address "221.y.y.y" of a network terminating device provided to the user D are associated with each other and registered. Also for a user E, in-IC card information and a global IP address are associated with each other and registered in a similar manner.

In the example of FIG. 1, a global IP address of the network terminating device 11 is set to "221.a.a.a". Since the user B is not subscribing femtocell service, the global IP address of the network terminating device 11 is not registered in the authentication table of the authentication server 5.

[Example of Authentication]

A flow of authentication of the femto base station 1 performed in the authentication system of FIG. 1 will be described here.

When the femto base station 1 is installed by having the IC card inserted therein, being connected to the network terminating device 2 and so on, and is powered on as indicated as #1 at the upper left of FIG. 1, the femto base station 1 sends an authentication request to the network terminating device 2, as indicated by an outline arrow #3. In a packet to be sent as the authentication request by the femto base station 1, the in-IC card information "111 . . . 111" of the IC card inserted into the femto base station 1 is contained, and in its header, the local IP address "192.168.3.x" assigned to the femto base station 1 is described.

Receiving the authentication request from the femto base station 1, the network terminating device 2 converts the local IP address "192.168.3.x" described in the header of the packet to the global IP address "221.x.x.x" assigned to the network terminating device 2 itself.

After converting the IP address, the network terminating device 2 sends the packet having the converted IP address as an authentication request to the femto concentrator 4 through the network 3, as indicated by an outline arrow #3. In the packet to be sent by the network terminating device 2, the in-IC card information "111 . . . 111" is contained, and in its header, the global IP address "221.x.x.x" is described.

Receiving the authentication request from the network terminating device 2, the femto concentrator 4 generates authentication information by associating the in-IC card information "111 . . . 111" contained in the packet with the global IP address "221.x.x.x" described in the header, and sends the authentication information together with the authentication request to the authentication server 5 as indicated by an outline arrow #4.

Receiving the authentication information from the femto concentrator 4, the authentication server 5 performs authentication of the installation position of the femto base station 1 by checking the authentication information against information registered in the authentication table as indicated by an outline arrow #5.

Accordingly, the authentication server 5 determines that the installation position of the femto base station 1 is valid if the in-IC card information and the global IP address included in the authentication information have been associated with each other and registered in the authentication table.

On the other hand, the authentication server 5 determines that the installation position of the femto base station 1 is not valid if the in-IC card information and the global IP address included in the authentication information have not been associated with each other and registered in the authentication table. An installation position is determined to be not valid in a case where the same information as the in-IC card information included in the authentication information is registered, but a global IP address registered in association with it is different from the information included in the authentication information, or the same information as the global IP address included in the authentication information is registered, but in-IC card information registered in association with it is different from the information included in the authentication information.

In the example of FIG. 1, since the in-IC card information "111 . . . 111" and the global IP address "221.x.x.x" included in the authentication information have been associated with each other and registered in the authentication table, the installation position of the femto base station 1 is determined to be valid by the authentication server 5.

If the installation position of the femto base station 1 is determined to be valid, the authentication server 5 sends information indicating that the authentication has succeeded to the femto base station 1. The information sent from the authentication server 5 is received by the femto base station 1 through the femto concentrator 4, the network 3, and the network terminating device 2.

After receiving the information indicating that the authentication has succeeded, the femto base station 1 starts outputting radio waves to communicate with a mobile device. Thereby, the user A is allowed to make a voice call or the like using the femtocell managed by the femto base station 1.

As described above, in the authentication system of FIG. 1, whether a user of the femto base station is a valid user and whether a transmission channel to which the femto base station is connected is a valid transmission channel are determined, and if the both are valid, the installation position of the femto base station is determined to be valid. Thus, the in-IC card information indicates that the user of the femto base station is valid, that is, the user has subscribed the femtocell service (service subscriber). The global IP address indicates that the transmission channel to which the femto base station is connected is valid, that is, that the transmission channel of information outputted from the femto base station, such as the network terminating device and the network 3, is the channel specified by the carrier.

[Another Example of Authentication]

Figure 2:
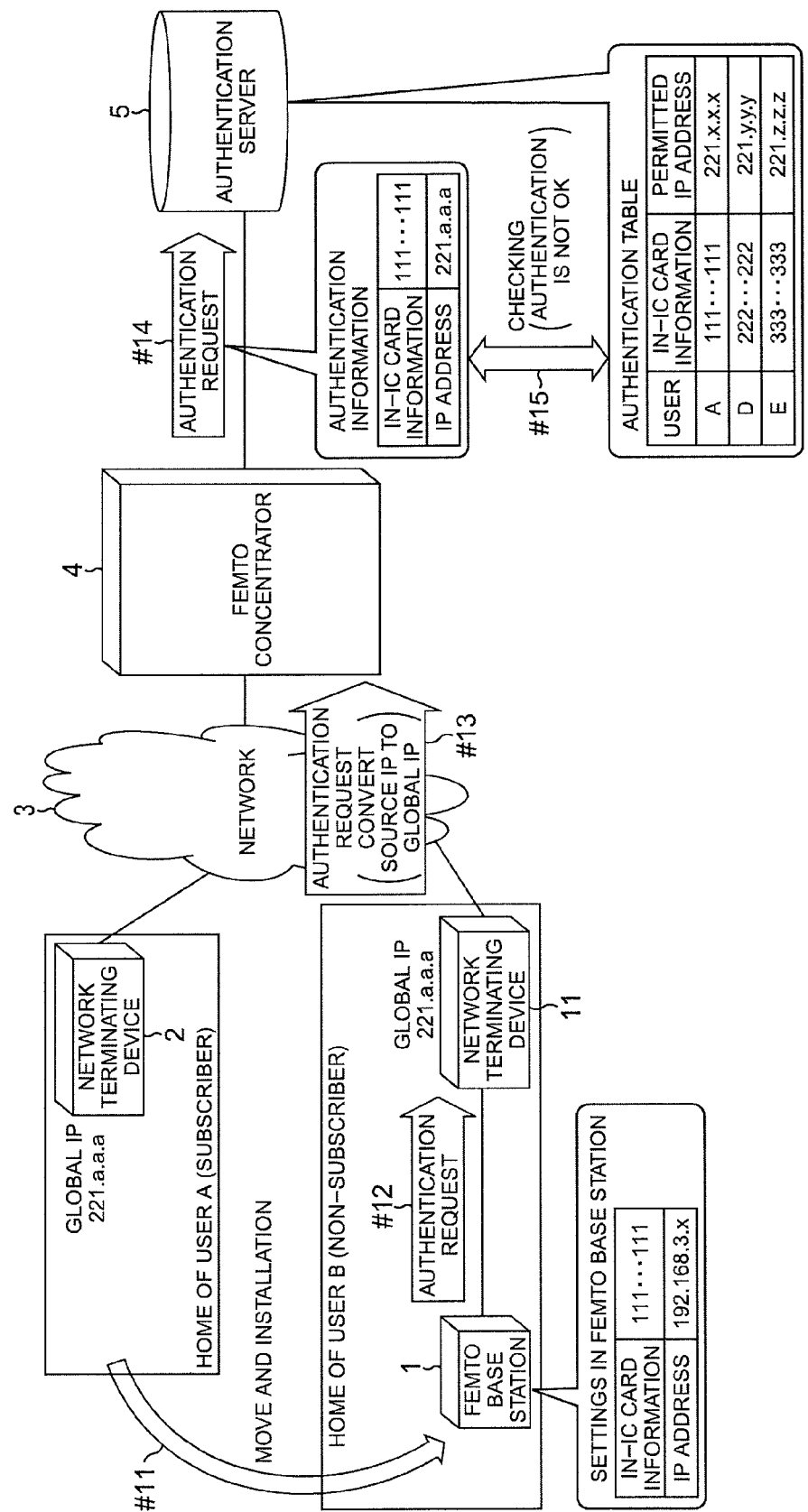
FIG. 2 is a diagram showing a configuration example of the authentication system and another example of the flow of authentication.

FIG. 2 is a diagram showing another example of authentication of the femto base station 1.

FIG. 2 shows an example in which the femto base station 1 provided to the user A is moved into the home of the user B as indicated by an outline arrow #11, and the femto base station 1 is installed by being connected to the network terminating device 11 provided to the user B. In the slot of the femto base station 1, the IC card issued to the user A is inserted.

When the femto base station 1 is powered on, the femto base station 1 sends an authentication request to the network terminating device 11 as indicated by an outline arrow #12. In a packet to be sent as the authentication request by the femto base station 1, in-IC card information "111 . . . 111" is contained, and in its header, a local IP address "192.168.3.x" assigned to the femto base station 1 within a LAN in the home of the user B is described.

Receiving the authentication request from the femto base station 1, the network terminating device 11 converts the local IP address "192.168.3.x" described in the header of the packet to a global IP address "221.a.a.a" assigned to the network terminating device 11 itself.

After converting the IP address, the network terminating device 11 sends the packet having the converted IP address as an authentication request to the femto concentrator 4 through the network 3, as indicated by an outline arrow #13. In the packet to be sent by the network terminating device 11, the in-IC card information "111 . . . 111" is contained, and in its header, the global IP address "221.a.a.a" is described.

Receiving the authentication request from the network terminating device 11, the femto concentrator 4 generates authentication information by associating the in-IC card information "111 . . . 111" contained in the packet with the global IP address "221.a.a.a" described in the header, and sends the authentication information to the authentication server 5 as indicated by an outline arrow #14.

Receiving the authentication information from the femto concentrator 4, the authentication server 5 performs authentication of the femto base station 1 by checking the authentication information against information registered in the authentication table as indicated by an outline arrow #15.

In the example of FIG. 2, the same information as the in-IC card information "111 . . . 111" included in the authentication information has been registered in the authentication table, but a global IP address registered in association with it is different from the global IP address "221.a.a.a" included in the authentication information. The authentication server 5 assumes that the installation position of the femto base station 1 which has sent the authentication information was moved, and determines the installation position to be not valid.

For example, if the installation position is determined to be not valid, information indicating that the authentication has failed is sent to the femto base station 1 as a response to the authentication request. It may be configured that no information is sent as a response.

Since information indicating that the authentication has succeeded is not sent from the authentication server 5, the femto base station 1 does not start outputting radio waves. Accordingly, the user B, for example, who borrows the femto base station 1 from the user A, cannot use the femtocell.

In this way, in-IC card information and a global IP address which becomes an permitted IP address are associated with each other and managed, and a femtocell is allowed to be used only when the authentication based on them succeeds, so that movement of the installation position of the femto base station can be substantially restricted.

[Configurations of Devices]

Configurations of the femto base station 1 and the authentication server 5 constituting the authentication system of FIG. 1 will be described.

Figure 3:
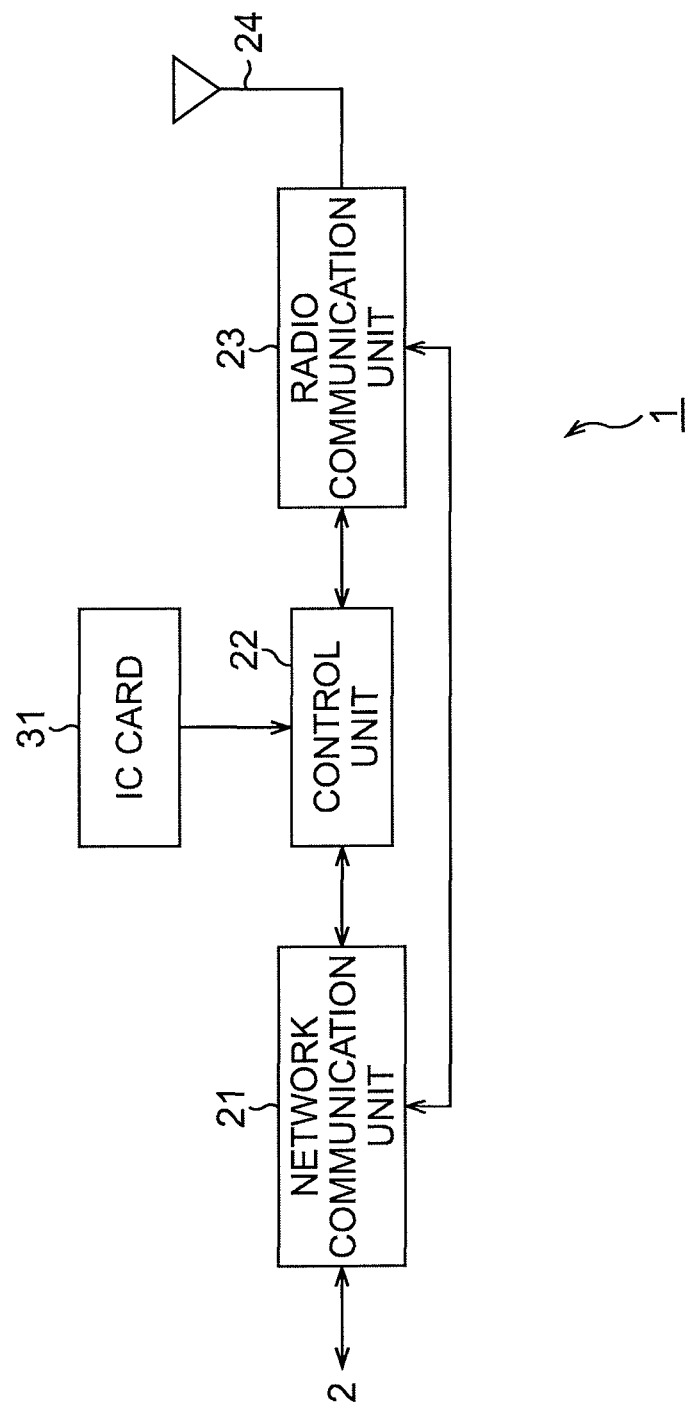
FIG. 3 is a block diagram showing a configuration example of a femto base station.

FIG. 3 is a block diagram showing a configuration example of the femto base station 1 installed in the home of the user A.

As shown in FIG. 3, the femto base station 1 is composed of a network communication unit 21, a control unit 22, a radio communication unit 23, and an antenna 24. An IC card 31 inserted into a slot formed in a case is connected to the control unit 22.

The network communication unit 21 communicates with the network terminating device 2 via wire or wireless according to a predetermined protocol such as TCP/IP (Transmission Control Protocol/Internet Protocol). In a header of a packet in which data to be sent by the network communication unit 21 to the network terminating device 2 is contained, a local IP address is described.

The network communication unit 21 outputs audio data from a mobile telephone of a communication partner, which is received by the network terminating device 2, to the radio communication unit 23, and on the other hand, outputs audio data from the mobile device used by the user A, which is supplied from the radio communication unit 23, to the network terminating device 2, thereby sending the audio data to the mobile telephone of the communication partner.

The control unit 22 is composed of a CPU (Central Processing Unit), a ROM (Read Only memory), a RAM (Random Access Memory) and the like, and executes a predetermined program to control overall operation of the femto base station 1.

For example, the control unit 22 controls the network communication unit 21 to send a packet containing in-IC card information stored in the IC card 31 to the network terminating device 2. In addition, when information indicating that authentication has succeeded, which is sent from the authentication server 5, is received by the network communication unit 21 and supplied to the control unit 22, the control unit 22 controls the radio communication unit 23 to start outputting radio waves.

The radio communication unit 23 outputs radio waves at a predetermined field strength, for example, the antenna power of which is 20 mW or less from the antenna 24, and performs radio communication with the mobile device such as a mobile telephone used by the user A according to standards such as W-CDMA or CDMA2000. The radio communication unit 23 sends audio data from the mobile telephone of the communication partner, which is supplied from the network communication unit 21, to the mobile telephone of the user A, and outputs audio data from the mobile telephone of the user A, which is received based on a signal supplied from the antenna 24, to the network communication unit 21.

The IC card 31 stores in-IC card information in a memory, and outputs in-IC card information read from the memory to the control unit 22.

Figure 4:
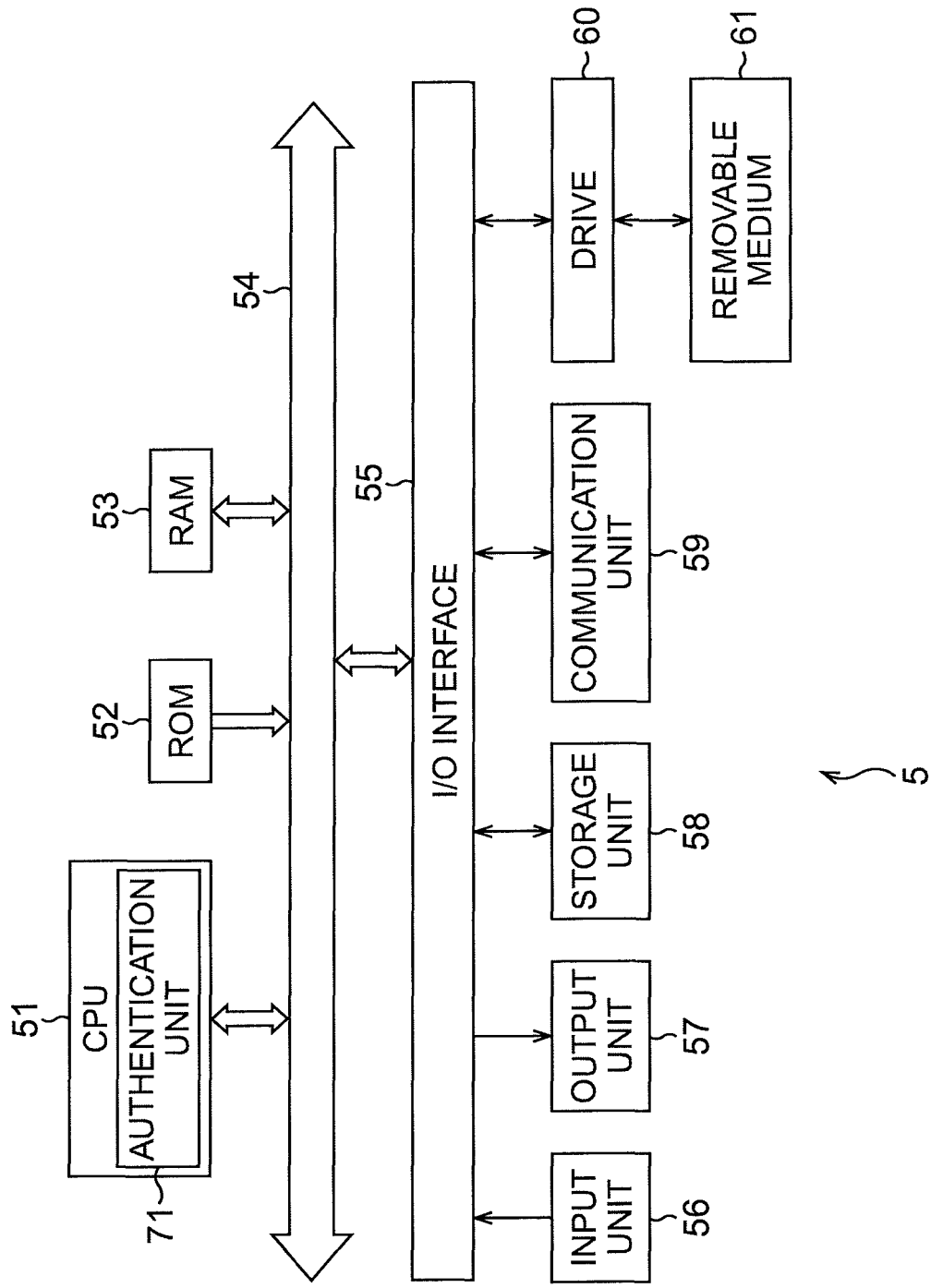
FIG. 4 is a block diagram showing a configuration example of an authentication server.

FIG. 4 is a block diagram showing a configuration example of the authentication server 5.

As shown in FIG. 4, the authentication server 5 is made up of a computer. Instead of one computer, the authentication server 5 may be formed by connecting a plurality of computers. A CPU 51, a ROM 52, and a RAM 53 are interconnected by a bus 54.

Further, an I/O interface 55 is connected to the bus 54. The input/output interface 55 is connected with an input unit 56 composed of a keyboard, a mouse and the like, and an output unit 57 composed of a display, a speaker and the like.

Further, the bus 54 is connected with a storage unit 58 composed of a hard disk, a nonvolatile memory and the like, a communication unit 59 which is composed of a network interface and the like and communicates with the femto concentrator 4, and a drive 60 which drives a removable medium 61. The storage unit 58 stores an authentication table such as shown in FIG. 1.

An authentication unit 71 performs authentication of the installation position of a femto base station which has sent an authentication request, with reference to the authentication table stored in the storage unit 58. The authentication unit 71 is implemented by the CPU 51 executing a predetermined program.

[Process of Authentication System]

Next, a process of each device of the authentication system will be described with reference to a flowchart of FIG. 5.

This process is started when, for example, the femto base station 1 is installed by having the IC card inserted therein, being connected to the network terminating device 2 and so on, and is powered on. Additionally, the process of FIG. 5 may be repeatedly performed at predetermined timing while the power is on.

In step S1, the control unit 22 of the femto base station 1 controls the network communication unit 21 to send a packet containing in-IC card information stored in the IC card 31 to the network terminating device 2 as an authentication request.

In step S11, the network terminating device 2 receives the authentication request from the femto base station 1, and in step S12, converts a local IP address described in the header of the packet to a global IP address. In step S13, the network terminating device 2 sends the packet having the converted IP address as the authentication request to the femto concentrator 4 through the network 3.

In step S21, the femto concentrator 4 receives the authentication request from the network terminating device 2, and generates authentication information by associating the in-IC card information contained in the packet with the global IP address described in the header of the packet. In step S22, the femto concentrator 4 sends the generated authentication information to the authentication server 5.

In step S31, the authentication unit 71 of the authentication server 5 controls the communication unit 59 to receive the authentication information. In step S32, the authentication unit 71 performs authentication of the installation position of the femto base station 1 by reading in the authentication table stored in the storage unit 58 and checking the authentication information against information registered in the read authentication table.

In step S33, the authentication unit 71 controls the communication unit 59 to send the authentication result to the femto concentrator 4. It this example, even if authentication has filed, information indicating this fact is sent.

In step S23, the femto concentrator 4 receives the authentication result sent from the authentication server 5, and in step S24, sends it to the network terminating device 2 through the network 3.

In step S14, the network terminating device 2 receives the authentication result sent from the femto concentrator 4, and in step S15, sends it to the femto base station 1.

In step S2, the network communication unit 21 of the femto base station 1 receives the authentication result sent from the network terminating device 2, and outputs it to the control unit 22.

In step S3, if the information indicating that the authentication has succeeded is sent to the control unit 22 as the authentication result, the control unit 22 controls the radio communication unit 23 to start outputting radio waves, and terminates the process after that.

Second Embodiment

Although in the foregoing, the femto concentrator 4 generates authentication information by associating in-IC card information with a global IP address and sends it to the authentication server 5, this may be performed by the network terminating device 2.

Figure 6:
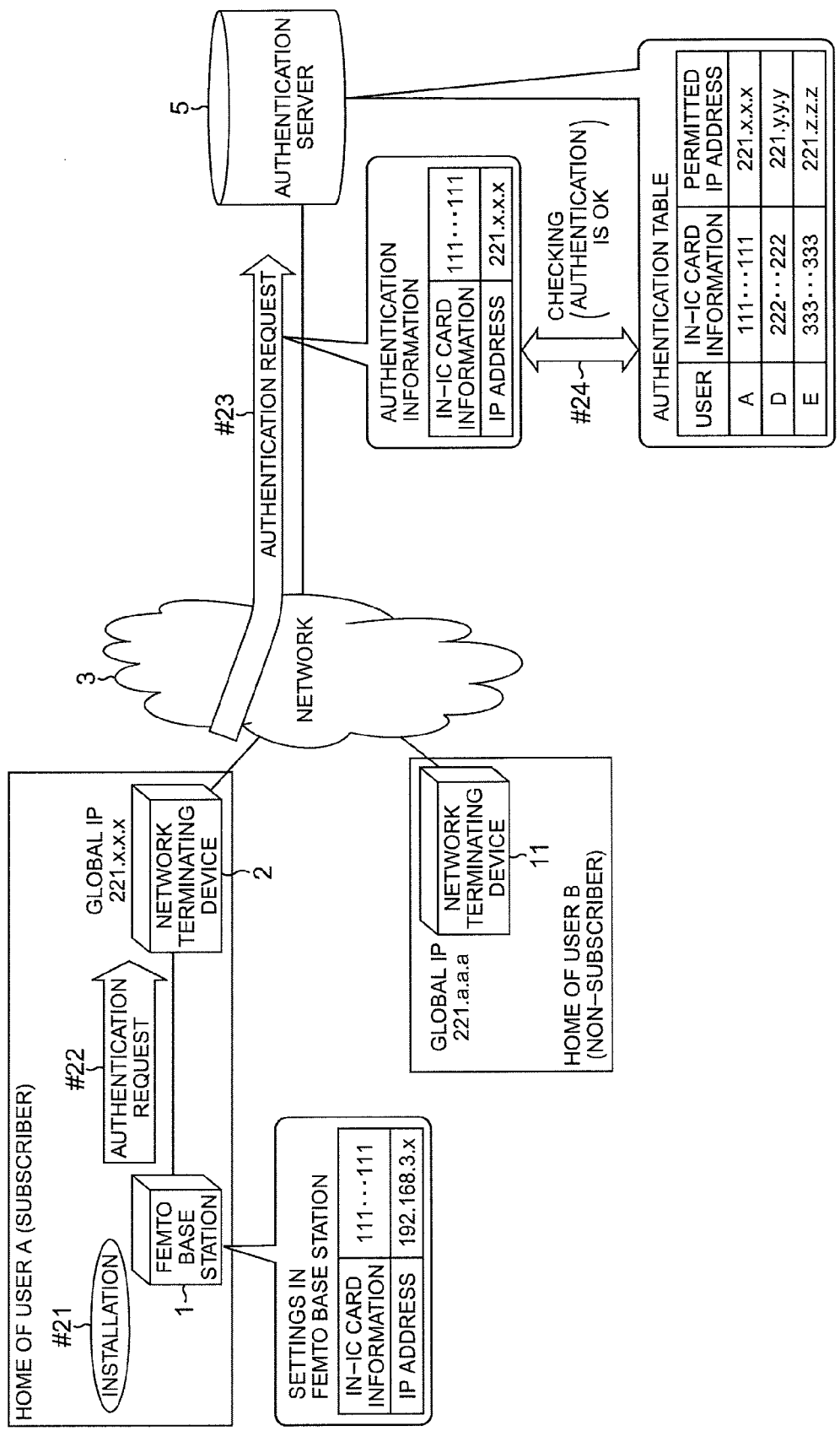
FIG. 6 is a diagram showing a configuration example of an authentication system and an example of a flow of authentication according to another embodiment of the present invention.

FIG. 6 is a diagram showing a configuration example of the authentication system and an example of a flow of authentication according to another embodiment of the present invention.

The configuration of the authentication system shown in FIG. 6 is similar to the configuration shown in FIG. 1 except that the femto concentrator 4 is not provided.

A flow of authentication of the femto base station 1 performed in the authentication system in FIG. 6 will be described. Description duplicating the above will be omitted as appropriate.

When being installed as indicated as #21 at the upper left of FIG. 6 and powered on, the femto base station 1 sends an authentication request to the network terminating device 2 as indicated by an outline arrow #22. In a packet to be sent as the authentication request by the femto base station 1, in-IC card information "111 . . . 111" of the IC card inserted into the femto base station 1 is contained, and in its header, a local IP address "192.168.3.x" assigned to the femto base station 1 is described.

Receiving the authentication request from the femto base station 1, the network terminating device 2 generates authentication information by associating the in-IC card information "111 . . . 111" contained in the packet with the global IP address "221.x.x.x" assigned to itself, and sends the authentication information together with the authentication request to the authentication server 5 as indicated by an outline arrow #23.

Receiving the authentication information from the network terminating device 2, the authentication server 5 performs authentication of the installation position of the femto base station 1 by checking the authentication information against information registered in the authentication table as indicated by an outline arrow #24, and sends the authentication result. Receiving the information indicating that the authentication has succeeded, the femto base station 1 starts outputting radio waves.

In this way, the network terminating device 2 may be allowed to generate authentication information by associating in-IC card information with a global IP address and send it to the authentication server 5

A process of each device of the authentication system of FIG. 6 will be described with reference to a flowchart of FIG. 7.

Figure 7:
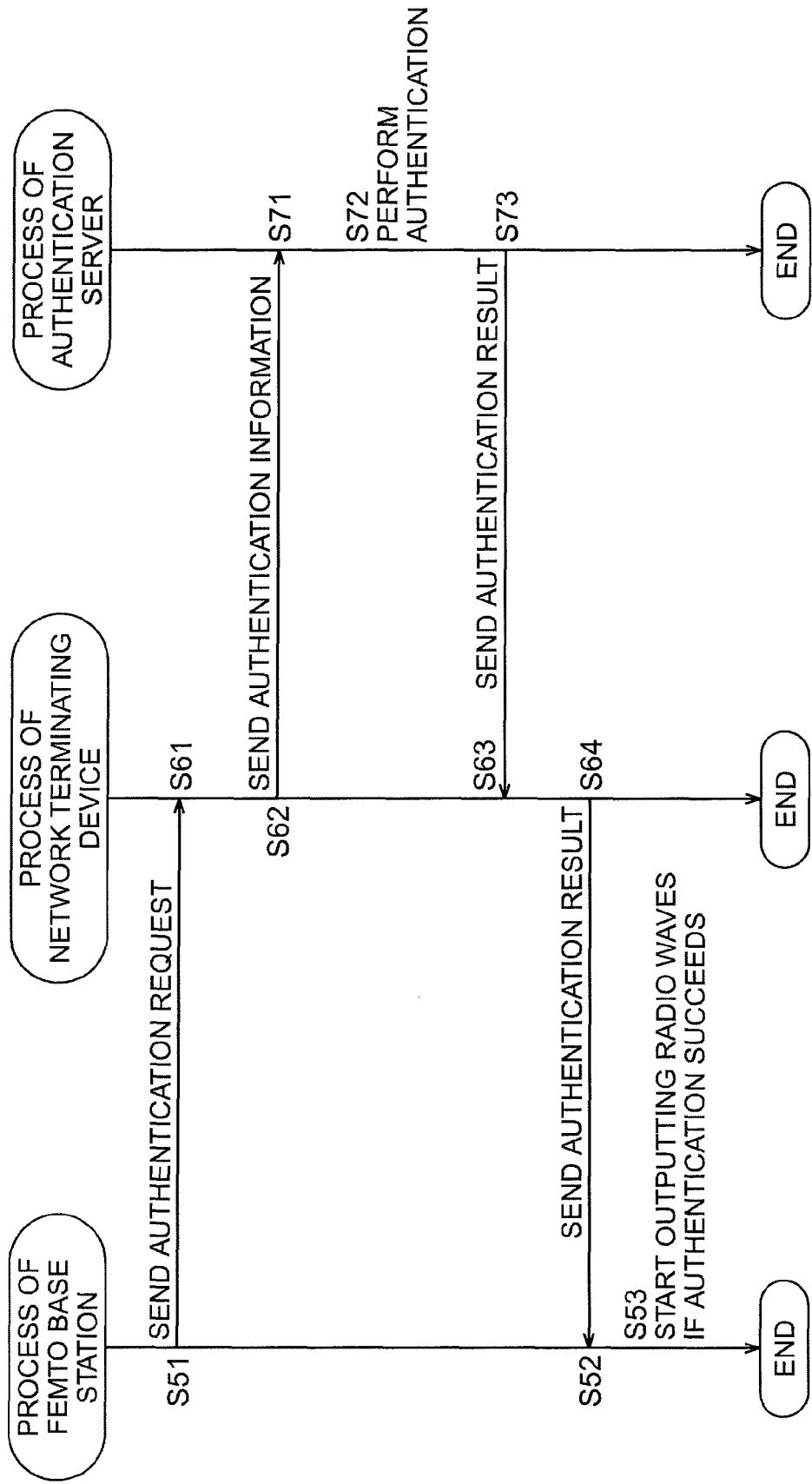
FIG. 7 is a flowchart illustrating a process of each device of the authentication system of FIG. 6.

The process in FIG. 7 is basically similar process to that described with reference to FIG. 5 except that there is no process for the femto concentrator 4 and that transmission of authentication information is performed by the network terminating device 2. Accordingly, in step S51, the control unit 22 of the femto base station 1 sends a packet containing in-IC card information to the network terminating device 2 as an authentication request.

In step S61, the network terminating device 2 receives the authentication request from the femto base station 1.

In step S62, the network terminating device 2 generates authentication information by associating the in-IC card information with a global IP address, and sends the generated authentication information together with the authentication request to the authentication server 5.

In step S71, the authentication unit 71 of the authentication server 5 receives the authentication information, and in step S72, performs authentication of an installation position of the femto base station 1. In step S73, the authentication unit 71 sends an authentication result to the network terminating device 2.

In step S63, the network terminating device 2 receives the authentication result sent from the authentication server 5, and in step S64, sends it to the femto base station 1.

In step S52, the network communication unit 21 of the femto base station 1 receives the authentication result and outputs it to the control unit 22. In step S53, if the information indicating that the authentication has succeeded is sent to the control unit 22 as the authentication result, the control unit 22 starts outputting radio waves, and terminates the process after that.

The above described process also allows the authentication server 5 to perform authentication of validity of an installation position of the femto base station 1.

<Modifications>

Embodiments of the present invention are not limited to the above described embodiments, and various modifications may be made without departing from the principle of the present invention.

For example, although as the femto base station 1 and the network terminating device 2, separate devices are used respectively in the above description, one device having the function of the femto base station 1 and the function of the network terminating device 2 may be used. Then, a subscriber of femtocell service is provided with such one device. The above described femto base station 1 will now be described to also have a function as the network terminating device.

In this case, as is assigned to the network terminating device, a fixed global IP address is previously assigned to the femto base station 1. In a header of a packet to be sent as an authentication request from the femto base station 1, a global IP address is described instead of a local IP address assigned in an in-house network to which the femto base station 1 is connected.

A process of the authentication system in a case where the femto base station 1 also having a function as the network terminating device is used will be described with reference to a flowchart of FIG. 8.

Figure 5:
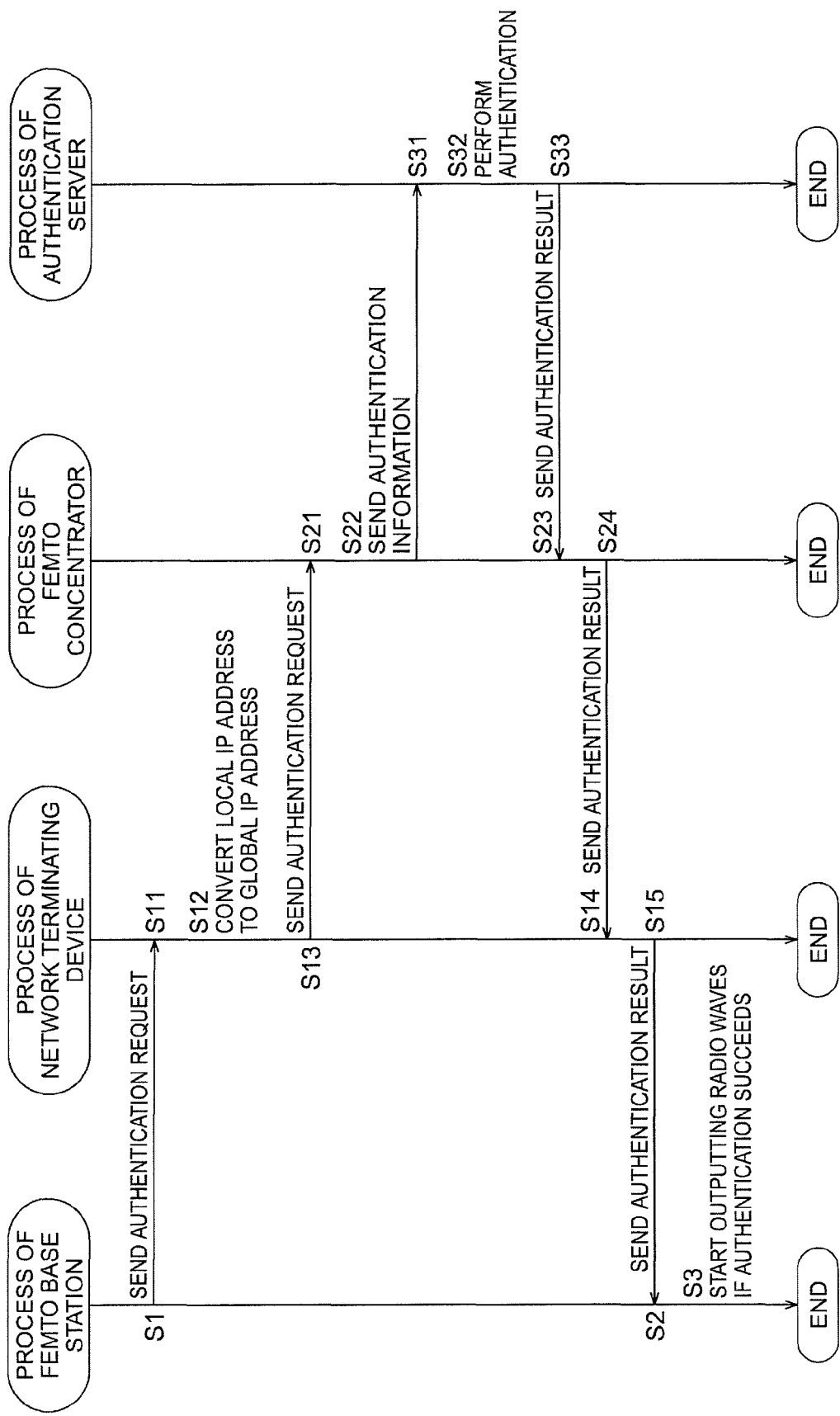
FIG. 5 is a flowchart illustrating a process of each device of the authentication system of FIG. 1.
Figure 8:
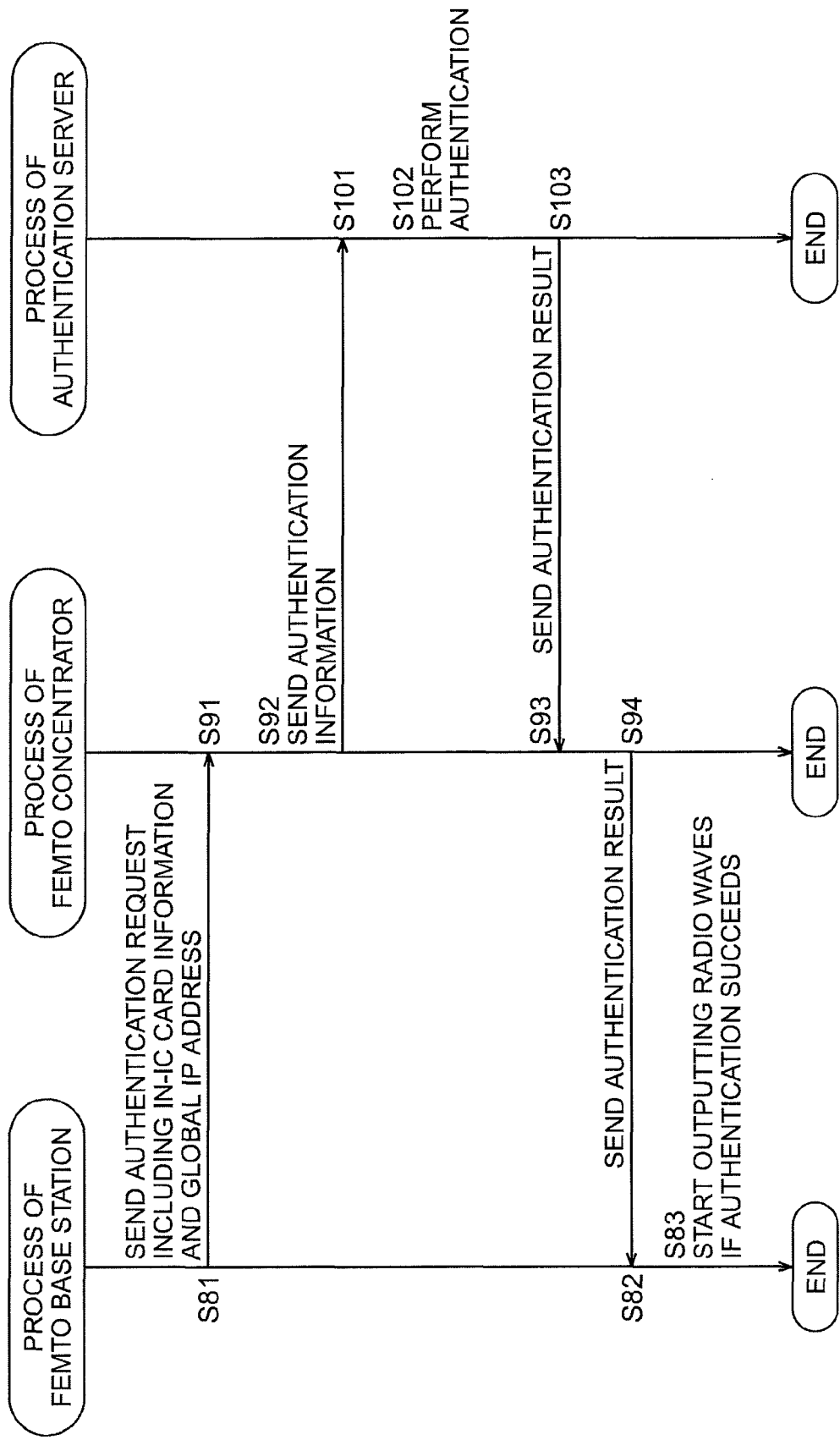
FIG. 8 is a flowchart illustrating another process of each device of the authentication system.

The process in FIG. 8 is similar to the process in FIG. 5 except that sending and receiving of information are performed not through the network terminating device 2, and that processing for converting a local IP address to a global IP address is not performed. FIG. 8 shows the process in which the femto concentrator 4 performs generating authentication information by associating in-IC card information with a global IP address.

In step S81, the control unit 22 of the femto base station 1 sends a packet containing in-IC card information stored in the IC card 31 to the femto concentrator 4 as an authentication request through the network 3.

In step S91, the femto concentrator 4 receives the authentication request from the femto base station 1, and in step S92, sends to the authentication server 5 authentication information generated by associating the in-IC card information with a global IP address.

In step S101, the authentication unit 71 of the authentication server 5 receives the authentication information sent from the femto concentrator 4, and in step S102, performs authentication of the installation position of the femto base station 1 by checking the authentication information against information registered in the authentication table. In step S103, the authentication unit 71 sends the authentication result to the femto concentrator 4.

In step S93, the femto concentrator 4 receives the authentication request sent from the authentication server 5, and in step S94, sends it to the femto base station 1 through the network 3.

In step S82, the network communication unit 21 of the femto base station 1 receives the authentication request sent from the femto concentrator 4, and outputs it to control unit 22.

In step S83, if the information indicating that the authentication has succeeded is sent to the control unit 22 as the authentication result, the control unit 22 controls the radio communication unit 23 to start outputting radio waves, and terminates the process after that.

In this way, the authentication server 5 is allowed to perform authentication of validity of an installation position of the femto base station 1 even in a case where the femto base station 1 is provided with the function as the network terminating device.

Next, another process of the authentication system in a case where the femto base station 1 also having a function as the network terminating device is used will be described with reference to a flowchart of FIG. 9.

Figure 9:
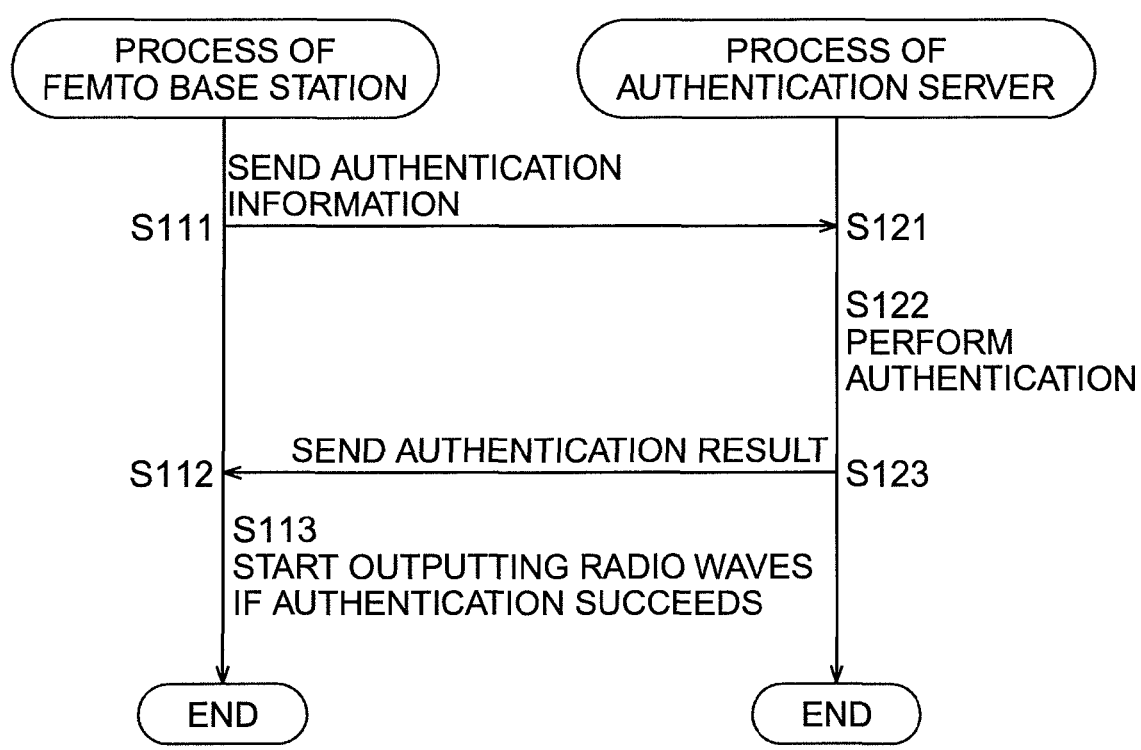
FIG. 9 is a flowchart illustrating a further alternative process of each device of the authentication system.

FIG. 9 shows the process in which the femto base station 1 also having the function as the network terminating device performs generating authentication information by associating in-IC card information with a global IP address. The process of FIG. 9 is basically similar to the process described with reference to FIG. 8 except that there is no process for the femto concentrator 4 and that transmission of authentication information is performed by the femto base station 1.

In step S111, the control unit 22 of the femto base station 1 sends to the authentication server 5 authentication information generated by associating in-IC card information stored in the IC card 31 with a global IP address assigned to itself.

In step S121, the authentication unit 71 of the authentication server 5 receives the authentication information sent from the femto base station 1, and in step S122, performs authentication of the installation position of the femto base station 1. In step S123, the authentication unit 71 sends the authentication result to the femto base station 1.

In step S112, the network communication unit 21 of the femto base station 1 receives the authentication result sent from the authentication server 5, and outputs it to the control unit 22.

In step S113, if the information indicating that the authentication has succeeded is sent to the control unit 22 as the authentication result, the control unit 22 controls the radio communication unit 23 to start outputting radio waves, and terminates the process after that.

Although in the above description, authentication of an installation position of a base station which manages a femtocell is performed, authentication of a base station which forms a small cell called a "picocell" or "microcell", instead of a femto base station can be performed by a similar process. A small base station refers to a base station which forms a small cell such as a femtocell, picocell, or microcell.

Although in the above description, in-IC card information written in an removable IC card is used as identification information of a femto base station, identification information which is written in storage means such as a ROM or RAM included in a femto base station at the time of manufacture of the femto base station may be used instead.

Although in the above description, a global IP address assigned to the network terminating device 2 of FIG. 1 and a global IP address assigned to the femto base station having the function of the network terminating device are fixed global IP addresses, these may be variable. A change of a global IP address is made at predetermined timing such as when a predetermined time elapses.

If a global IP address assigned to the network terminating device 2 or a global IP address assigned to the femto base station having the function of the network terminating device is changed, a global IP address managed by the authentication server 5 as a permitted IP address in association with in-IC card information is also changed to the same address as the changed global IP address.

The change of a global IP address in the authentication server 5 is performed by the authentication server 5 based on a notification from the network terminating device 2 which has changed the setting of its own global IP address or the femto base station having the function of the network terminating device. The change of a global IP address may be performed by the authentication server 5 based on a notification from a router device which has changed assignment of a global IP address.

A local IP address may be used inside the femto base station having the function of the network terminating device to perform authentication as described above.

Figure 10:
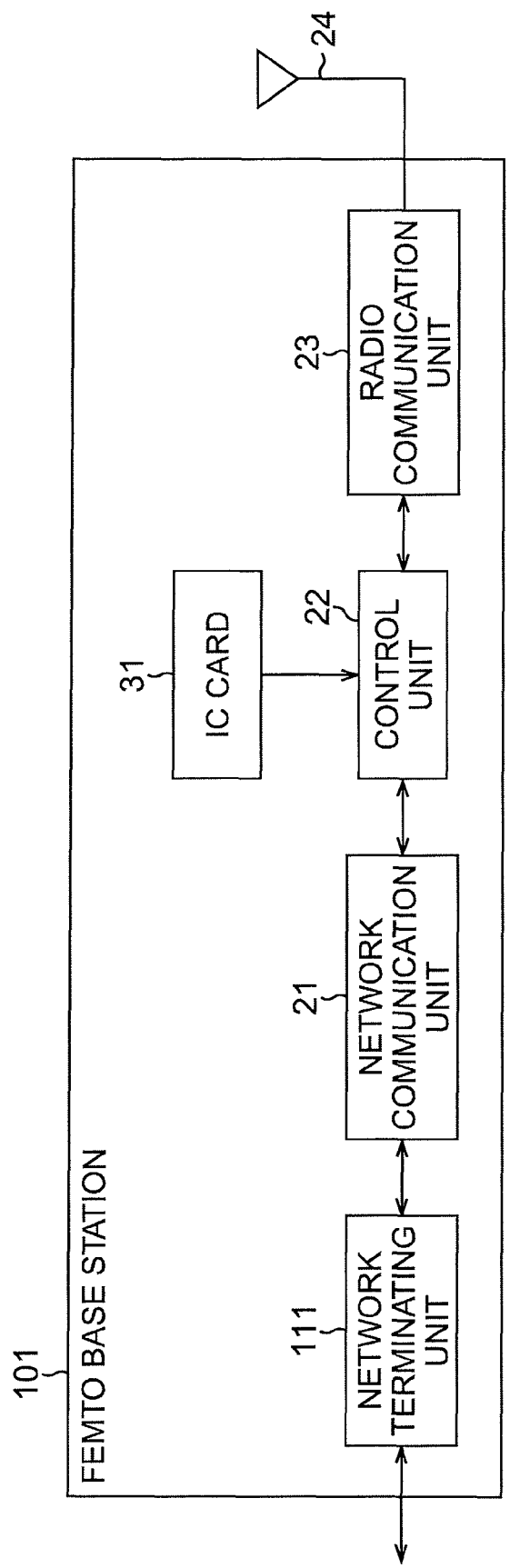
FIG. 10 is a block diagram showing another configuration example of the femto base station.

FIG. 10 is a block diagram showing a configuration example of a femto base station 101 which is a femto base station having the function of the network terminating device.

Among components shown in FIG. 10, the same components as those shown in FIG. 3 are given the same symbols. Duplicate descriptions will be omitted as appropriate.

The configuration of the femto base station 101 shown in FIG. 10 is different from the configuration shown in FIG. 3 in that a network terminating unit 111 having a function as a modem is additionally provided. Further, it is different from the configuration shown in FIG. 3 in that data from the network communication unit 21 to the radio communication unit 23 is sent via the control unit 22, and data from the radio communication unit 23 to the network communication unit 21 is sent via the control unit 22.

The network communication unit 21 has a function of NAT in the femto base station 101, and the network communication unit 21 assigns a local IP address to a module composed of the control unit 22 and the radio communication unit 23.

The network communication unit 21 receives an authentication request sent from the control unit 22 at the time of authentication of the femto base station 101. In a packet to be sent as the authentication request by the control unit 22, in-IC card information of the IC card 31 is contained, and in its header, the local IP address assigned to the module composed of the control unit 22 and the radio communication unit 23 is described.

Receiving the authentication request from the control unit 22, the network communication unit 21 converts the local IP address described in the header of the packet to a fixed or variable global IP address assigned to the network communication unit 21 itself.

After converting the IP address, the network communication unit 21 controls the network terminating unit 111 to send the packet having the converted IP address as the authentication request to the femto concentrator 4 through the network 3, in a case where authentication information directed to the authentication server 5 is to be generated by the femto concentrator 4 as described with reference to FIG. 1.

On the other hand, in a case where authentication information directed to the authentication server 5 is to be generated by a device on the femto base station side as described with reference to FIG. 6, the network communication unit 21 controls the network terminating unit 111 to generate authentication information by associating the in-IC card information with the global IP address and send it to the authentication server 5 through the network 3.

In this way, authentication processing may be performed using a local IP address inside the femto base station having the function of the network terminating device.

Although the network communication unit 21 has the NAT function in FIG. 10, the NAT function may be provided in the control unit 22 or the network terminating unit 111.

REFERENCE SIGNS LIST

1 Femto base station, 2 Network terminating device, 3 Network, 4 Femto concentrator, 5 Authentication server, 21 Network communication unit, 22 Control unit, 23 Radio communication unit, 24 Antenna, 31 IC card, 71 Authentication unit

What is claimed is:

1. An authentication system including a small base station which performs communication with a mobile device and whose coverage area is an area smaller than a coverage area of a macro base station that constitutes a public network, a network terminating device which is connected to the small base station through an in-house network and connected to a wide area network, and an authentication server, wherein the small base station comprises:
circuitry that sends a first authentication request to the network terminating device, the first authentication request including identification information of itself and a local IP address assigned within the in-house network, wherein the network terminating device comprises:
circuitry that converts the local IP address included in the first authentication request to a fixed global IP address previously assigned to itself and sending a second authentication request to the authentication server through the wide area network, the second authentication request including the fixed global IP address and the identification information sent from the small base station, and wherein the authentication server comprises:
storage means for storing identification information of each small base station and a fixed global IP address previously assigned to a network terminating device to which each respective small base station is connected, such that the identification information and the fixed global IP address are associated with each other; and authentication means for performing authentication of the small base station which has sent the first authentication request wherein the small base station is determined to be valid if the identification information and the fixed global IP address which are included in the second authentication request have been associated with each other and stored in the storage means, and determined to be not valid if the identification information and the fixed global IP address have not been associated with each other and stored, wherein the storage means pre-stores both the fixed global IP address of the network terminating device and the identification information of the small base station in association with each other when the small base station and the network terminating device are provided to a user, and wherein the authentication means looks up an authentication table in the storage means, compares the fixed global IP address of the network terminating device and the identification information of the small base station received in the second authentication request with a list of global IP addresses stored in the authentication table, and determines that the small base station is valid if the list of global IP addresses in the authentication table has an entry in which the fixed global IP address of the network terminating device received in the second authentication request is associated with the identification information of the small base station received in the second authentication request.

2. The authentication system of claim 1, wherein when the small base station is previously associated with the terminating device in the storage means, the small base station is permitted to communicate with the mobile device.

3. The authentication system of claim 1, wherein the small base station is permitted to communicate with the mobile device when the network terminating device is previously associated with the small base station in the storage means.

4. The authentication system of claim 1, wherein the identification information is associated with a specific geographical location.

5. The authentication system of claim 1, wherein a card comprising identification information of the small base station is installed in the small base station for associating the identification information of the small base station to a geographical location.

6. The authentication system of claim 1, wherein a card comprising identification information of the small base station is installed in the small base station for associating the identification information of the small base station to a geographical location.

7. The authentication system of claim 1, wherein the authentication table comprise the list of global IP addresses corresponding to a plurality of network terminating devices, each of the global IP addresses associated with identification information of a respective one of a plurality of small base stations.

8. A small base station which performs communication with a mobile device and whose coverage area is an area smaller than a coverage area of a macro base station that constitutes a public network, the small base station comprising:

circuitry that sends a first authentication request to a network terminating device, the first authentication request including identification information of itself and a local IP address assigned within the in-house network, wherein in the network terminating device which has received the first authentication request, the local IP address assigned to the small base station within the in-house network is converted to a fixed global IP address previously assigned to the network terminating device, and the converted IP address is sent as a second authentication request to an authentication server through the wide area network, and wherein in the authentication server which has received the second authentication request, authentication of the small base station is performed wherein the small base station is determined to be valid if the identification information and the fixed global IP address which are included in the second authentication request have been associated with each other and stored in storage means, and determined to be not valid if the identification information and the fixed global IP address have not been associated with each other and stored, wherein the storage means pre-stores the fixed global IP address of the network terminating device in association with each other when the small base station and the network terminating device are provided to a user, wherein the authentication server looks up an authentication table in the storage means, compares the fixed global IP address of the network terminating device and the identification information of the small base station received in the second authentication request with a list of global IP addresses stored in the authentication table, and determines that the small base station is valid if the list of global IP addresses in the authentication table has an entry in which the fixed global IP address of the network terminating device received in the second authentication request is associated with the identification information of the small base station received in the second authentication request.

9. The small base station according to claim 8, further comprising radio communication controlling means for starting outputting a radio wave if information which is sent from the authentication server and which indicates that authentication has succeeded is supplied through the network terminating device.

10. An authentication system including a small base station which performs communication with a mobile device and whose coverage area is an area smaller than a coverage area of a macro base station that constitutes a public network, a network terminating device which is connected to the small base station through an in-house network and connected to a wide area network, a concentrator which is connected to the network terminating device through the wide area network, and an authentication server, wherein the small base station comprises:

circuitry that sends a first authentication request to the network terminating device, the first authentication request including identification information of itself and a local IP address assigned within the in-house network, wherein the network terminating device comprises:

circuitry that converts the local IP address included in the first authentication request to a fixed global IP address previously assigned to itself and sending a second authentication request to the concentrator through the wide area network, the second authentication request including the fixed global IP address and the identification information sent from the small base station, and wherein the concentrator comprises:

circuitry that sends authentication information to the authentication server, the authentication information associating the identification information sent from the network terminating device and the fixed global IP address with each other, and wherein the authentication server comprises:
storage means for storing identification information of each small base station and a fixed global IP address previously assigned to a network terminating device to which each respective small base station is connected, such that the identification information and the fixed global IP address are associated with each other; and
authentication means for performing authentication of the small base station which has sent the first authentication request wherein the small base station is determined to be valid if the identification information and the fixed global IP address which are included in the authentication information have been associated with each other and stored in the storage means, and determined to be not valid if the identification information and the fixed global IP address have not been associated with each other and stored,
wherein the storage means pre-stores the fixed global IP address of the network terminating device in association with each other when the small base station and the network terminating device are provided to a user,
wherein the authentication means looks up an authentication table in the storage means, compares the fixed global IP address of the network terminating device and the identification information of the small base station received in the second authentication request with a list of global IP addresses stored in the authentication table, and determines that the small base station is valid if the list of global IP addresses in the authentication table has an entry in which the fixed global IP address of the network terminating device received in the second authentication request is associated with the identification information of the small base station received in the second authentication request.

11. An authentication method of a small base station which performs communication with a mobile device and whose coverage area is an area smaller than a coverage area of a macro base station that constitutes a public network, the authentication method comprising:
sending a first authentication request to a network terminating device, the first authentication request including identification information of itself and a local IP address assigned within the in-house network,
wherein in the network terminating device which has received the first authentication request, the local IP address assigned to the small base station within the in-house network is converted to a fixed global IP address assigned to the network terminating device, and the converted IP address is sent as a second authentication request to the authentication server through the wide area network, and
wherein in the authentication server which has received the second authentication request, authentication of the small base station is performed wherein the small base station is determined to be valid if the identification information and the fixed global IP address which are included in the second authentication request have been associated with each other and stored in storage means, and determined to be not valid if the identification information and the fixed global IP address have not been associated with each other and stored,
wherein the storage means pre-stores the fixed global IP address of the network terminating device in association with each other when the small base station and the network terminating device are provided to a user, and
wherein the authentication server looks up an authentication table in the storage means, compares the fixed global IP address of the network terminating device and the identification information of the small base station received in the second authentication request with a list of global IP addresses stored in the authentication table, and determines that the small base station is valid if the list of global IP addresses in the authentication table has an entry in which the fixed global IP address of the network terminating device received in the second authentication request is associated with the identification information of the small base station received in the second authentication request.

12. A small base station which performs communication with a mobile device and whose coverage area is an area smaller than a coverage area of a macro base station that constitutes a public network, the small base station being connected with a wide area network, the small base station comprising:
circuitry that sends an authentication request including identification information of itself and a fixed global IP address assigned to itself to an authentication server connected through the wide area network,
wherein in the authentication server which has received the authentication request, authentication of the small base station itself is performed wherein the small base station is determined to be valid if the identification information and the fixed global IP address which are included in the authentication request have been associated with each other and stored in storage means, and determined to be not valid if the identification information and the fixed global IP address have not been associated with each other and stored,
wherein the storage means pre-stores the fixed global IP address of the network terminating device in association with each other when the small base station and the network terminating device are provided to a user,
wherein the authentication server looks up an authentication table in the storage means, compares the fixed global IP address of the network terminating device and the identification information of the small base station received in an authentication request with a list of global IP addresses stored in the authentication table, and determines that the small base station is valid if the list of global IP addresses in the authentication table has an entry in which the fixed global IP address of the network terminating device received in the authentication request is associated with the identification information of the small base station received in the authentication request.

13. A small base station which performs communication with a mobile device and whose coverage area is an area smaller than a coverage area of a macro base station that constitutes a public network, the small base station being connected with a wide area network, the small base station comprising:
circuitry that generates an authentication request including identification information of the small base station and a local IP address assigned inside the small base station;
a control unit via its CPU that assigns the local IP address to the circuitry that generates and converts the local IP address included in the authentication request generated by the circuitry that generates to a fixed global IP address of a network terminating device; and
circuitry that sends the authentication request including the identification information and the fixed global IP address to an authentication server connected through the wide area network,
wherein in the authentication server which has received the authentication request sent from the circuitry that sends, authentication of the small base station itself is performed wherein the small base station is determined to be valid if the identification information and the fixed global IP address have been associated with each other and stored in storage means, and determined to be not valid if the identification information and the fixed global IP address have not been associated with each other and stored, wherein the storage means pre-stores the fixed global IP address of network terminating device in association with each other when the small base station and the network terminating device are provided to a user, and wherein the authentication server looks up an authentication table in the storage means, compares the fixed global IP address of the network terminating device and the identification information of the small base station received in an authentication request with a list of global IP addresses stored in the authentication table, and determines that the small base station is valid if the list of global IP addresses in the authentication table has an entry in which the fixed global IP address of the network terminating device received in the authentication request is associated with the identification information of the small base station received in the authentication request.

* * * * *